US007713600B2

(12) United States Patent
Lisec

(10) Patent No.: US 7,713,600 B2
(45) Date of Patent: May 11, 2010

(54) INSULATING GLASS UNIT WITH AN ELASTOPLASTIC SPACER STRIP AND A METHOD OF APPLYING THE SPACER STRIP

(76) Inventor: Peter Lisec, Bahnhofstr. 34, A-3363 Hausmening-Amstetten (AT)

( * ) Notice: Subject to any disclaimer, the term of this patent is extended or adjusted under 35 U.S.C. 154(b) by 323 days.

(21) Appl. No.: 11/753,229

(22) Filed: May 24, 2007

(65) Prior Publication Data

US 2007/0275192 A1 Nov. 29, 2007

(30) Foreign Application Priority Data

May 24, 2006 (DE) ...................... 10 2006 024 402

(51) Int. Cl.
*E06B 3/00* (2006.01)
*E04C 2/54* (2006.01)
*C03C 27/00* (2006.01)

(52) U.S. Cl. ....................... 428/34; 156/109; 52/786.13

(58) Field of Classification Search ................... 428/34; 156/109, 272.2, 275.5; 52/172, 786.1, 786.13
See application file for complete search history.

(56) References Cited

U.S. PATENT DOCUMENTS 5,007,217 A 4/1991 Glover et al.
5,332,538 A * 7/1994 Levinson et al. ............ 264/492
5,851,609 A * 12/1998 Baratuci et al. ............... 428/34
5,962,090 A 10/1999 Trautz
6,192,652 B1 2/2001 Goer et al.
6,389,779 B1 * 5/2002 Brunnhofer ............. 52/786.13
6,528,131 B1 * 3/2003 Lafond ........................ 428/34

FOREIGN PATENT DOCUMENTS

DE 4333033 C1 5/1995
DE 9408764 U1 11/1995
EP 0261923 B1 3/1988
GB 1549875 8/1979
WO 0238903 A1 5/2002

* cited by examiner

*Primary Examiner*—Donald Loney
(74) *Attorney, Agent, or Firm*—Edell, Shapiro & Finnan, LLC

(57) ABSTRACT

An insulating glass unit includes an elastoplastic spacer strip and at least two panes. The spacer strip includes a drying agent and has side surfaces configured to adhere to opposite pane surfaces, an inside surface configured to face an inside space between the panes, and an outer surface that is opposite to the inside surface and is coated with a vapor-sealing layer. The spacer strip is dimensionally stable and has a high absorption capacity for water vapor. The spacer strip includes a jacket of a silicone material and a core of the drying agent.

21 Claims, 1 Drawing Sheet

INSULATING GLASS UNIT WITH AN ELASTOPLASTIC SPACER STRIP AND A METHOD OF APPLYING THE SPACER STRIP

CROSS REFERENCE TO RELATED APPLICATIONS

This application claims priority under 35 U.S.C. §119 to Application No. DE 102006024402.8 filed on May 24, 2006, entitled "Insulating Glass Unit with an Elastoplastic Spacer Strip, and Method of Application of the Latter," the entire contents of which are hereby incorporated by reference.

FIELD OF THE INVENTION

An insulating glass unit includes at least two panes and an elastoplastic spacer strip comprising a jacket and a core of a drying agent. The spacer strip has side surfaces configured to adhere to opposite pane surfaces, an inside surface configured to face the inside space between the panes, and an outside surface that is opposite to the inside surface and is coated with a vapor-sealing layer.

BACKGROUND

Known spacer strips consist preferably of silicone foam with which up to about 30% of a drying agent (which in the following refers for short also to a mixture of a plurality of drying agents) has been admixed. For the drying agent to achieve its purpose of removing moisture from the inside space between the panes, the silicon foam is of an open-pore structure. Therefore a (water) vapor-sealing layer is needed on the outside of the spacer strip, which also should be resistant to UV radiation, but should not prevent the strip from being bent to a short radius of curvature, or from being shaped to form an angle (following a punching-out of a corner wedge) in the corners of an insulating glass unit. Although a very thin aluminum layer, as usually deposited by sputtering, does not prevent the spacer strip from being bent, or shaped to form an angle, it nevertheless has a tendency to form micro-cracks that adversely affect sealing to vapor diffusion.

Because the known spacer strip consists of silicone foam combined with a drying agent, it is of only limited dimensional stability. Apart from this, only relatively small amounts of drying agent can be mixed with the silicon resin, because otherwise both the strength and the elastic properties of the strip are impaired.

Known insulating glass units have a similar spacer. The similar spacer consists of a hollow synthetic resin section that is preferably reinforced with glass fibers and contains a drying agent that communicates with the inside space of the insulating glass unit via perforations in the spacer.

Another similar spacer is known which consists of a synthetic-resin section, e.g., of PVC, filled with a drying agent.

SUMMARY

Described herein is an insulating glass unit including at least two panes and an elastoplastic spacer strip. The elastoplastic spacer strip comprises a jacket and a core of a drying agent. The spacer strip has side surfaces configured to adhere to opposite pane surfaces, an inside surface configured to face the inside space between the panes, and an outside surface that is opposite to the inside surface and is coated with a vapor-sealing layer.

The insulating glass unit with the described spacer strip combines high dimensional stability with a high ability to absorb water vapor.

The jacket comprises a silicone material. The drying agent of the core is bound with a synthetic resin. The silicone jacket and the drying agent core configured to be co-extruded.

The following describes the function and relationships of different parts of the spacer strip. The silicone material jacket that is free from drying agent ensures resistance to UV radiation, elasticity, and high dimensional stability. The core of drying agent can constitute a considerable portion of the cross-section of the strip, so that the volume proportion of the drying agent can be increased up to 70%. The ability to absorb water vapor per unit of length of the strip becomes correspondingly greater. Thereby, the service life of the insulating glass unit, i.e., the time until condensed water is formed inside the insulating glass unit due to saturation of the drying agent, is increased. At the same time, expensive silicone material is saved in manufacture of the strip.

The silicone jacket must be rendered pervious to water vapor at least in the region of the inside surface of the strip. Therefore, the silicone jacket can optionally consist entirely of an open-pore silicone foam.

Alternatively, the silicone jacket may be substantially or completely solid, and have open pores only in the region of the inside surface of the strip.

For the same purpose, the silicone jacket may be solid, but provided with micro-perforations in the region of the inside surface of the strip.

Optionally, the silicone jacket may be provided as a solid, i.e., pore-free, in the region of the inside surface of the strip with one, but preferably a plurality of narrow slits.

If the silicone jacket includes only one single wide slit in the region of the inside surface of the strip, then, in this exemplary embodiment, the slit may be filled with an open-pore synthetic resin, at best by way of co-extrusion.

The vapor-sealing layer optionally comprises a thin foil of stainless steel. This foil is impervious to diffusion, non-sensitive to bending and buckling, and also, as distinct from aluminum, corrosion-resistant.

According to a development of this embodiment, the steel foil can encompass both of the edges of the strip located between its outside surface and its side surfaces, and is then firmly seated.

Each side surface of the strip may include longitudinally extending, recessed surface portions contiguous to the edge of the outside surface.

These oppositely disposed, lateral, recessed surface portions may be formed as undercuts, as seen from the outside surface of the strip.

In the embodiment in which the steel foil encompasses both edges of the strip located between its outside surface and its side surfaces, the steel foil may also cover at least partially the recessed surface portions of the side surfaces of the strip. Thereby, the adhesion of the steel foil on the strip is further improved.

At least the recessed surface portions of the side surfaces of the strip can be coated in the course of its application between the two glass panes with a butyl adhesive that ensures sealing to vapor diffusion. The remaining side surfaces may be coated with a commercially available, strongly adhering adhesive, for example on acrylic basis.

The steel foil may be affixed via adhesive onto the strip.

Alternatively, the steel foil may be connected to the strip via co-extrusion.

The spacer strip may be applied as follows by being rolled onto the first glass pane using a device known per se (the second glass pane is subsequently merely urged against the composite of the first glass pane and the spacer strip):

The side surfaces of the strip, which are smooth or optionally designed to be stepped in accordance with an exemplary embodiment, are coated on a part of their height, for example on one half of their height, with the above already mentioned strongly adhering adhesive which is at first covered with a protective foil. Following a removal of the protective foil, a thin strand of a butyl adhesive is applied to the remaining part of each side surface. Directly following this, the strip is applied against the first glass pane and fixedly adheres thereto.

Optionally, the side surface of the strip intended to be adhered to the pane, but free of adhesive, is treated via high-energy radiation after being removed from a strip supply, before its application and expediently shortly before being coated with the butyl strand. This surface treatment, known in particular as corona method and as plasma method, can extend along the entire height of the respective side surface, or optionally, only to the surface portion that has been coated with the strongly adherent adhesive during the application of the previously described method. The treatment of the surface with the high-energy radiation replaces the strongly adherent adhesive and leads to an activation of the surface, which renders the latter itself strongly adhesive according to the "inclusion" of oxygen atoms or of ozone molecules which considerably improve the wetting and adhesive properties, in particular of synthetic resins on smooth materials such as glass.

BRIEF DESCRIPTION OF THE DRAWINGS

The insulating glass unit with the spacer strip and method are explained in more detail below with reference to exemplary embodiments, where.

DETAILED DESCRIPTION

Figure 1:
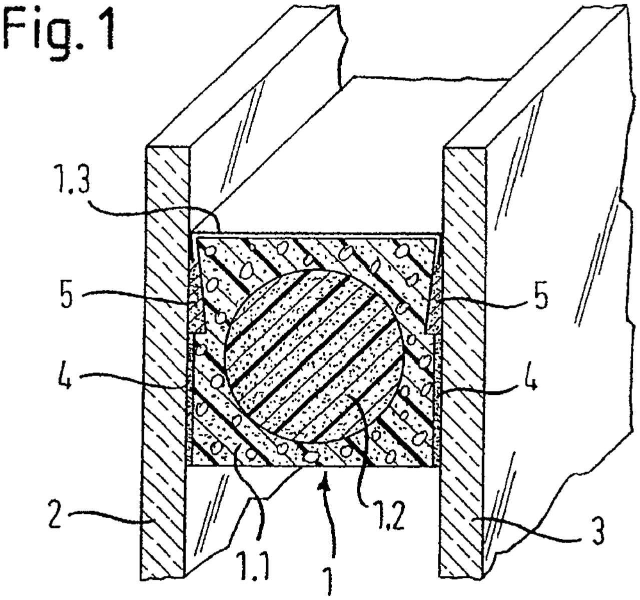
FIG. 1 illustrates an applied spacer strip between two glass panes according to an exemplary embodiment of the invention.

FIG. 1 shows a spacer strip 1 according to an exemplary embodiment, between panes 2 and 3 of an insulating glass unit. The strip 1 is fixed onto the panes 2 and 3 via a strongly adherent adhesive 4 as known per se, e.g., an adhesive based on acrylate. This adhesive is optionally present on the side surfaces of the strip 1 already before its application, and is activated, as known per se, via pulling off protective foils immediately prior to the application. Because the known, strongly adherent adhesives are not resistant to vapor diffusion, a vapor-diffusion resistant adhesive 5, i.e., a butyl adhesive, is additionally present between the side surfaces of the strip and the glass panes. This is applied immediately prior to the application of the strip, and permanently retains its viscous elastic properties, as is also known. The projection of the glass panes 2 and 3 beyond the spacer strip 1 forms a conventional peripheral edge-joint which is filled, as is also known, with a polymerizing synthetic resin (not illustrated), in particular on polysulfide basis, during the next manufacturing step.

In this embodiment the spacer strip 1 comprises a silicone jacket 1.1, of open-pore silicone foam (symbolically indicated in FIG. 1), and a core, for example, of circular cross-section, of a synthetic-resin bound drying agent or drying agent mixture 1.2.

The outside surface of the spacer strip 1 is covered with a thin foil 1.3 of stainless steel. This foil 1.3 may be laminated onto the spacer strip 1. The foil is so thin and stretchable that it also makes possible a bending of the strip 1 through an angle (after corner-wedges have been punched-out on the inner side) at the corners of the insulating glass unit without any formation of micro-cracks occurring.

Figure 2:
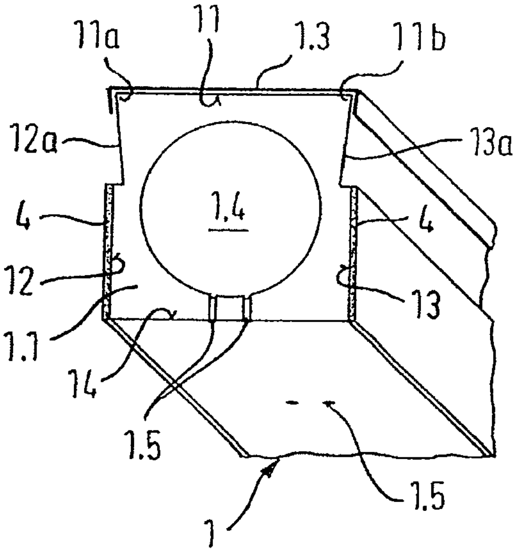
FIGS. 2 to 4 illustrates various embodiments of the spacer strip according to the invention.

FIG. 2 shows a similar embodiment of the spacer strip 1. In this exemplary embodiment, the spacer strip 1 comprises an outside surface 11, two opposite side surfaces 12 and 13, and also an inside surface 14. As seen from the outside surface 11, the side surfaces 12 and 13 each include a recessed surface portion 12*a* and 13*a* contiguous to the edges 11*a* and 11*b* of the outside surface 11. The steel foil 1.3 on the outside surface 11 is folded around the edges 11*a* and 11*b*, so that the side edges of the steel foil 1.3 partially cover the surface portions 12*a* and 13*a* of the strip. The remaining regions of the side surfaces are coated with the adhesive 4, as shown in FIG. 1. As in the case of FIG. 1, the strip comprises a silicone jacket 1.1 and includes a core hollow space 1.4 for the drying agent. However, in this embodiment, the silicone jacket 1.1 comprises solid pore-free silicone. To produce communication for diffusion between the core hollow space 1.4 and the inside space of the pane, the inside surface 14 of the strip is provided with numerous micro-perforations 1.5, here indicated as being enlarged.

Figure 3:
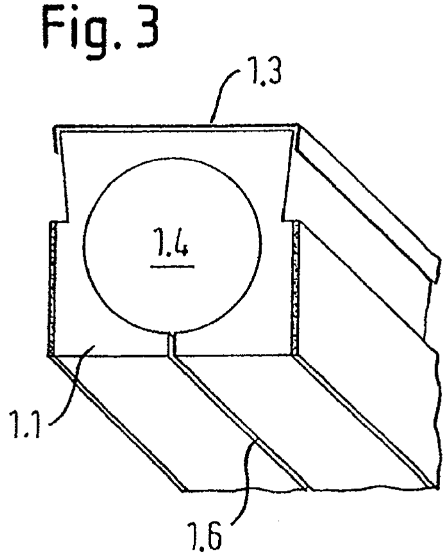

FIG. 3 shows a similar embodiment, in which however the silicone jacket 1.1, here also solid, comprises a narrow longitudinal slit 1.6 in the region of the inside surface of the strip to ensures water-vapor permeable communication between the inside of the pane and the core hollow space 1.4. Instead of a through slit, a plurality of slits may be provided, which are separated and may be disposed to be offset from each other.

Figure 4:
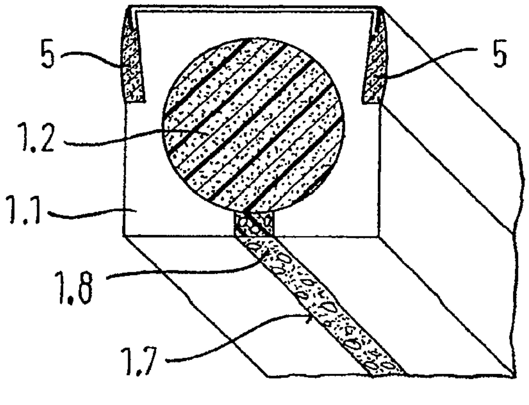

FIG. 4 shows another embodiment including, instead of the narrow slit 1.6, a comparatively substantially wider slit 1.7 in the silicone jacket 1.1. This slit 1.7 is filled with an open-pore synthetic resin 1.8, e.g., silicone foam, through which water vapor from the pane inside space diffuses to the drying agent 1.2 and is thereby absorbed.

Furthermore, in this exemplary embodiment the side surfaces 12 and 13 of the strip are not coated with the strongly adherent adhesive 4, but derive their strongly adhesive properties from being irradiated with high-energy radiation, for example, according to the corona method, in the not shown application device shortly before an application of the butyl strands 5 on both sides.

While the invention has been described in detail with reference to specific embodiments thereof, it will be apparent to one of ordinary skill in the art that various changes and modifications can be made therein without departing from the spirit and scope thereof. Accordingly, it is intended that the present invention covers the modifications and variations of this invention provided they come within the scope of the appended claims and their equivalents.

What is claimed is:

1. An insulating glass unit comprising:

at least two panes; and an elastoplastic spacer strip disposed between the two panes, the spacer strip comprising:

side surfaces configured to adhere to opposing pane surfaces of the at least two panes;

an inside surface configured to face an inside space between the panes;

an outside surface opposite the inside surface:

a co-extruded core and silicone jacket structure, wherein:

the core comprises a drying agent bound by a synthetic resin, the silicone jacket surrounds the core; and a vapor-sealing layer covering the outside surface of the spacer strip.

2. The insulating glass unit according to claim 1, wherein the silicone jacket is water vapor permeable along the inside surface of the spacer strip.

3. The insulating glass unit according to claim 2, wherein the silicone jacket is a silicone foam having a plurality of open pores.

4. The insulating glass unit according to claim 2, wherein the silicone jacket is completely solid and further comprises a plurality of micro-perforations along the inside surface of the spacer strip.

5. The insulating glass unit according to claim 2, wherein the silicone jacket is completely solid and further comprises a slit along the inside surface of the spacer strip.

6. The insulating glass unit according to claim 5, wherein the silicone jacket further comprises an open-pore synthetic resin disposed in the slit.

7. The insulating glass unit according to claim 1, wherein the vapor-sealing layer comprises a stainless steel foil.

8. The insulating glass unit according to claim 7, wherein the steel foil encompasses edges of the spacer strip between the outer surface and the side surfaces.

9. The insulating glass unit according to claim 7, wherein each side surface of the spacer strip further comprises: a longitudinally extending recessed surface portion contiguous with an edge of the outside surface.

10. The insulating glass unit according to claim 9, wherein the recessed surface portions are undercuts extending from the outside surface of the strip.

11. The insulating glass unit according to claim 9, wherein the parts of the steel foil encompassing the edges cover at least part of the recessed surface portions.

12. The insulating glass unit according to claim 9, further comprising a butyl adhesive coated on the recessed surface portions of the side surfaces of the strip.

13. The insulating glass unit according to claim 7, wherein the steel foil is attached to the strip via an adhesive.

14. The insulating glass unit according to claim 7, wherein the steel foil is attached to the strip via co-extrusion.

15. A method of applying a spacer strip to at least one pane of an insulating glass unit according to claim 1, the method comprising:

removing the spacer strip from a strip supply;

treating a side surface of the strip, configured to adhere to the at least one pane, with high-energy radiation, thereby improving the wetting and adhesive properties of the treated side surface of the strip; and applying the spacer strip to the at least one pane.

16. The insulating glass unit according to claim 1, wherein the jacket consists essentially of silicone.

17. The insulating glass unit according to claim 1 further comprising a water vapor resistant adhesive layer oriented between the glass panes and the jacket, wherein the adhesive layer secures the spacer strip to the glass pane.

18. The insulating glass unit according to claim 1, wherein:

the vapor sealing layer is in contact with the silicone jacket;

the vapor sealing layer further covers a portion of each spacer strip side surface; and the unit further comprises an adhesive layer to secure the spacer to the glass pane, the adhesive layer oriented between the glass pane and the vapor sealing layer portion on each side surface.

19. The insulating glass unit according to claim 1, wherein the silicone jacket is free of drying agent.

20. An insulating glass unit comprising:

a first pane and a second pane defining an inside pane space; and an elastoplastic spacer strip oriented between the panes, the spacer strip having a first side surface facing the first pane, a second side surface facing the second pane, an inside surface to facing the inside pane space, an outside surface opposite the inside surface; wherein the spacer strip comprises:

a central core comprising a drying agent and a synthetic resin binder, a silicone jacket covering the core, wherein the silicone jacket is free of drying agent, and a vapor-sealing layer applied to the silicone jacket such that the vapor sealing layer defines the outside surface of the spacer strip, wherein the inside surface of the spacer strip is permeable to water vapor.

21. The insulating glass unit according to claim 20 further comprising a water-vapor-diffusion resistant adhesive securing the first side surface to the first pane and the second side surface to the second pane.

* * * * *